United States Patent [19]

Ström

[11] Patent Number: 4,628,687
[45] Date of Patent: Dec. 16, 1986

[54] GAS TURBINE COMBUSTOR WITH PNEUMATICALLY CONTROLLED FLOW DISTRIBUTION

[75] Inventor: Sigmunn Ström, Kongsberg, Norway

[73] Assignee: A/S Kongsberg Vapenfabrikk, Kongsberg, Norway

[21] Appl. No.: 610,509

[22] Filed: May 15, 1984

[51] Int. Cl.[4] ............................................. F02C 9/00
[52] U.S. Cl. .................................. 60/39.23; 60/39.29; 60/758
[58] Field of Search .................. 60/39.23, 39.297, 40, 60/741, 758, 39.27

[56] References Cited

U.S. PATENT DOCUMENTS

| | | | |
|---|---|---|---|
| 2,807,933 | 10/1957 | Martin | 60/39.23 |
| 2,957,306 | 10/1960 | Attinello | 415/DIG. 1 |
| 3,474,813 | 10/1969 | Servanty et al. | 137/81.5 |
| 3,631,675 | 1/1972 | Keiter et al. | 60/39.23 |
| 3,722,218 | 3/1973 | Lapera | 60/740 |
| 3,738,106 | 6/1973 | Stein et al. | 60/39.23 |
| 3,910,035 | 10/1975 | Juhasz et al. | 60/39.23 |
| 4,085,579 | 4/1978 | Holzapfel et al. | 60/39.04 |
| 4,090,360 | 5/1978 | Erismann | 60/39.29 |
| 4,446,692 | 5/1984 | Adkins | 60/39.23 |

FOREIGN PATENT DOCUMENTS 917080 12/1946 France.
1124095 10/1956 France.
2024402 1/1980 United Kingdom.

OTHER PUBLICATIONS

Mowill et al., "New Radial Engine Technology from Kongsberg", ASME pub. 83-GT-221, Mar. 1983.

Primary Examiner—Louis J. Casaregola
Attorney, Agent, or Firm—Finnegan, Henderson, Farabow, Garrett & Dunner

[57] ABSTRACT

A combustor for a gas turbine including a burner defining an axial fluid flow path between upstream and downstream ends, a burner casing coaxially surrounding the burner and defining an annular conduit for inlet gas flow from downstream to upstream ends of the burner, ports for introducing part of the inlet gas into the upstream end of the burner, a fuel nozzle introducing fuel into the upstream end of the burner, slots circumferentially disposed around the burner casing upstream of the ports and a conduit and valve arrangement for introducing external air to the annular conduit through the slots to generate an annular vortex to restrict inlet gas flow to the ports when the turbine is operating at predetermined operating conditions.

12 Claims, 2 Drawing Figures

GAS TURBINE COMBUSTOR WITH PNEUMATICALLY CONTROLLED FLOW DISTRIBUTION

BACKGROUND OF THE INVENTION

1. Field of the Invention

The present invention relates to combustors for gas turbines, and in particular, to a pneumatic means for controlling flow distribution in such combustor.

2. Description of the Prior Art

Conventional combustors or combustion chambers in a gas turbine are designed to operate most efficiently at a particular power level, normally the power level at which the turbine is generally operated. At this power level the fuel injectors provide a given amount of fuel for mixing with a given volume of air or combustion-generating gas to provide the optimum fuel-air ratio.

A turbine, however, requires less power during start and idle. Such reduced power levels generally are achieved by reducing the fuel flow into the combustor. With a constant air supply, the fuel-air ratio during start and idle is leaner than optimum. This may result in unstable burning. While mechanical means for controlling air flow into a combustor during start and idle may be used, the complexity of such devices and the temperature environment in which they must operate have rendered them undesirable.

Accordingly, it is an object of this invention to provide a pneumatic means for limiting air flow into a combustor during start and idle thereby maintaining optimum fuel-air ratio while avoiding the disadvantages of mechanical means for controlling air flow.

SUMMARY OF THE INVENTION

The objects and advantages of the invention may be realized and obtained by means of the instrumentalities and combinations particularly pointed out in the appended claims.

In accordance with the invention, as embodied and broadly described herein, a combustor for a gas turbine comprises a burner defining an axial fluid-flow path between upstream and downstream ends thereof, a burner casing coaxially surrounding the burner and defining an annular conduit for inlet gas flow from downstream to upstream ends of the burner, means for introducing fuel into the burner proximate the upstream end thereof, a primary means for introducing part of the inlet gas flow into the burner proximate the upstream end thereof to generate a combustible mixture, and restrictor means for introducing external gas into the annular conduit and for generating a pneumatic restriction to inlet gas flow to the primary means when the turbine is operating at predetermined operating conditions.

Preferably the restrictor means comprises a plurality of annular slots in the burner casing for introducing an external gas into the annular chamber and for generating an annular vortex, a means for conducting the external gas to the slots, and valve means responsive to turbine operating conditions for controlling external gas flow through the conducting means.

It is preferred that the valve means be electrically openable to permit external gas flow through the conducting means in response to signals representing turbine operating conditions. While the electrical signal to the valve means may represent turbine rotor speed, other turbine parameters such as pressure and temperature at the compressor exit may also be used.

BRIEF DESCRIPTION OF THE DRAWINGS

The accompanying drawings, which are incorporated in and constitute a part of the specification, illustrate one embodiment of the invention, and together with the description, serve to explain the principles of the invention.

DETAILED DESCRIPTION OF THE PREFERRED EMBODIMENTS

Reference will now be made in detail to the present preferred embodiments of the invention, examples of which are illustrated in the accompanying drawings.

Figure 1:
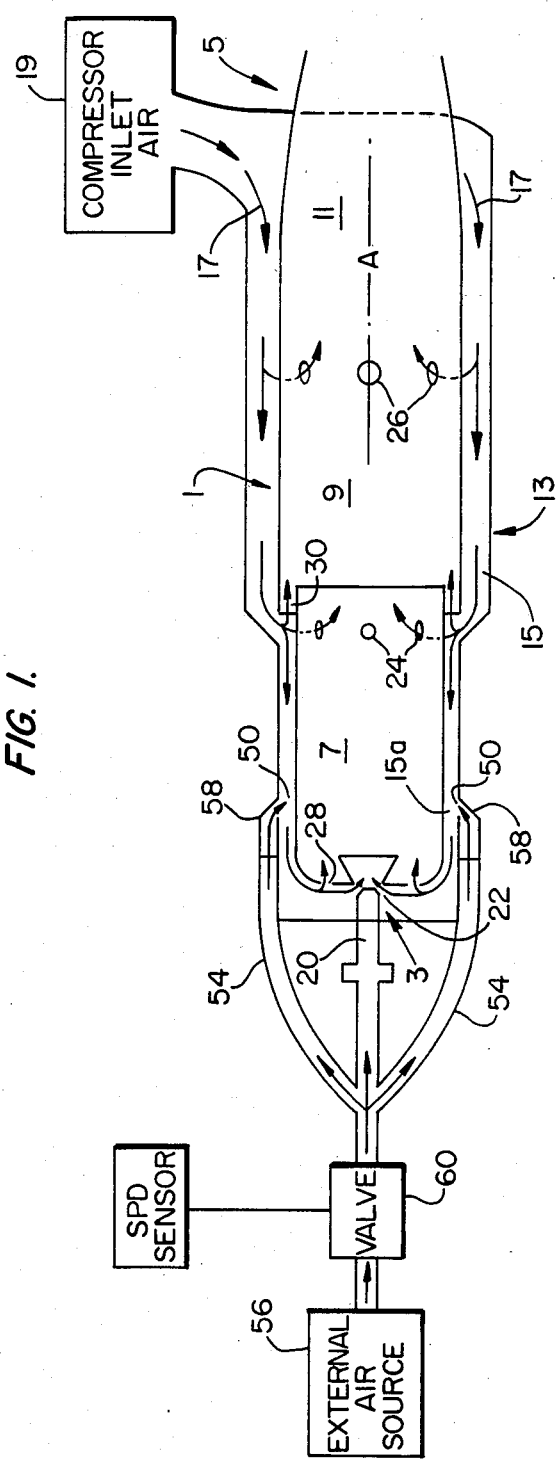
FIG. 1 is a longitudinal cross-sectional view of an embodiment of the invention.

The combustor of the invention comprises a burner defining an axial fluid-flow path between upstream and downstream ends thereof. As depicted in FIG. 1, burner 1 defines an axial fluid flow path A between upstream end 3 and downstream end 5.

Preferably, burner 1 includes, in axial alignment, an upstream section defining a first combustion zone 7, a downstream section defining a second combustion zone 9, and an exhaust section 11 at the downstream end 5 of the burner.

Also in accordance with the invention, the combustor comprises a burner casing coaxially surrounding the burner and defining an annular conduit for inlet flow of combustion-supporting gas from downstream to upstream ends of the burner. As depicted in FIG. 1, burner casing 13 coaxially surrounds burner 1 and defines an annular conduit 15 for a flow of an inlet gas, generally compressed air, indicated by arrow 17 from downstream end 5 to upstream end 3 of burner 1.

The inlet air is generally provided by a compressor 19 although it may be provided from any other source. The flow of inlet air 17 in annular chamber 15 provides convection cooling of burner 1 while preheating the inlet air.

In accordance with the invention, the combustor includes means for introducing fuel into the burner proximate the upstream end thereof. As depicted in FIG. 1, air blast fuel nozzle 20 projects through the upstream end 3 of burner 1 to inject fuel into first combustion zone 7. Other types of known fuel injectors may be used as generally depicted at 21 in FIG. 2.

In accordance with the invention, the combustor includes at least a first means for introducing a primary part of the inlet gas into the burner proximate the upstream end thereof to generate a combustible fuel-air mixture. As may be seen in FIGS. 1 and 2, the upstream end 3 of burner 1 has openings 22 through which inlet air flows from annular chamber 15. Ports 22 disposed around air blast fuel nozzle 20 (FIG. 1) or 21 (FIG. 2) constitute primary means for introducing inlet air into first combustion zone 7 for mixing with the fuel injected through blast nozzle 20 or fuel injection nozzle 21. Burner 1 may also include apparatus (not shown) surrounding fuel nozzle 20 or 21 to induce swirling in the fuel-air mixture to enhance mixing.

Figure 2:
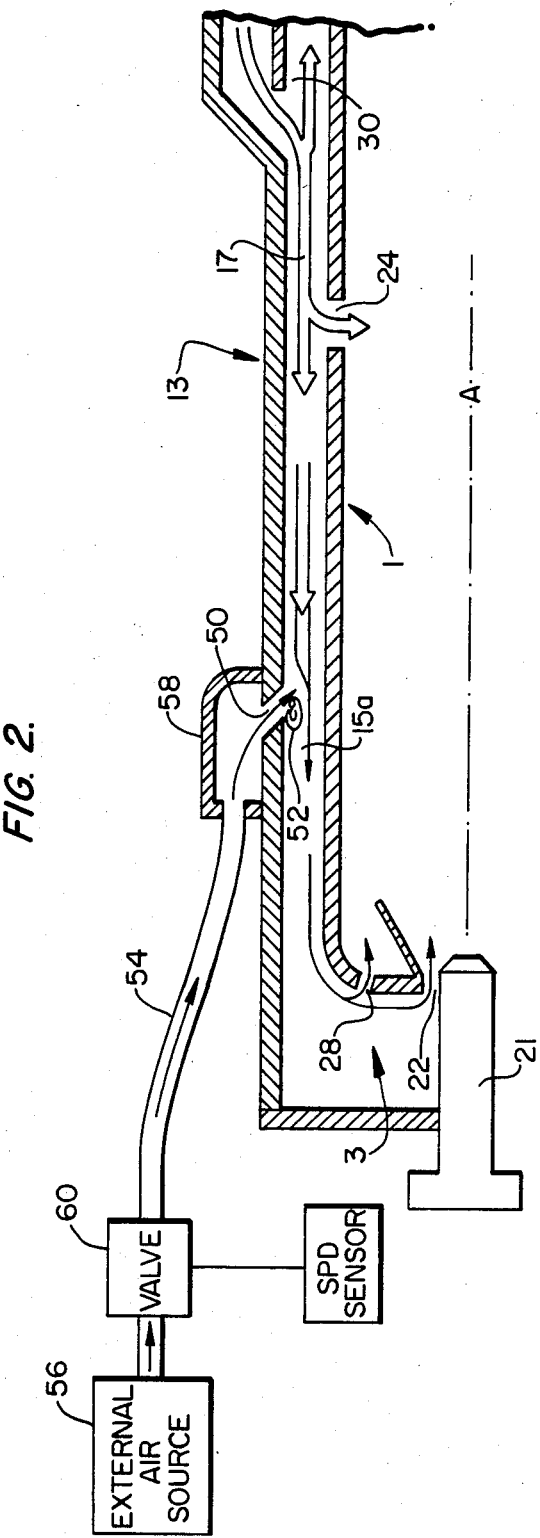
FIG. 2 is an enlarged, partial cross-sectional view of the combustor of FIG. 1 incorporating components of a second embodiment of the invention.

Preferably, as depicted in FIGS. 1 and 2, burner 1 incorporates second means for introducing primary air into the burner at the intersection between first and second combustion zones 7, 9 for mixing with uncombusted fuel flowing from first combustion zone 7. In particular, a plurality of ports 24 are circumferentially disposed around the burner for communication with the downstream end of first combustion zone 7 and the upstream end of second combustion zone 9.

Also the burner preferably includes means for introducing dilution air into the exhaust section 11 for controlling exhaust gas temperature. As depicted in FIG. 1, a plurality of ports 26 are spaced around the circumference of burner 1 for communication with exhaust section 11.

Burner 1 may also include include ports 28 at the upstream end 3 thereof for introducing cooling gas or air about the inside periphery of first combustion zone 7. The cooling air can be made to generate swirling action within combustion zone 7 to enhance mixing within the combustion zone. Similarly, ports 30 are provided at a junction between the first and second combustion zones 7 and 9 to introduce additional cooling air into second combustion zone 9 about the inside periphery of burner 1. This cooling air generates a swirling action within second combustion zone 9 to enhance the mixing of unburned fuel exiting from first combustion zone 7 with second primary air introduced through ports 24.

In the preferred embodiment of the combustor of the invention, inlet gas or air flows axially of the burner and is distributed among the various ports in certain proportions. Preferably, of the total inlet air, 18% is the first primary air, 18% is the second primary air, 44% is dilution air, 12% is first cooling air and 8% is second cooling air.

In accordance with the invention, the combustor includes a restrictor means for introducing external gas into the annular conduit and for generating a pneumatic restriction to inlet gas flow to the primary means when the turbine is operating at predetermined operating conditions. In the preferred embodiments, as depicted in FIGS. 1 and 2, the restrictor means comprises a plurality of slots 50 circumferentially spaced about burner casing 13, each slot directing external gas into the flow path of inlet gas 17 for generating annular vortex 52 restricting inlet gas flow through a portion 15a of the annular chamber 15. Preferably, the annular vortex 52 is generated at a position downstream of the second primary inlet ports 24 and upstream of first primary inlet ports 22 and first cooling inlet ports 28. Annular vortex 52 constitutes a localized area of disturbed air in annular chamber 15 and forms a pneumatic restriction to the flow of inlet gas or air through that portion of annular chamber 15 thereby limiting the amount of inlet air introduced into first combustion chamber 7 through primary inlet ports 22.

Preferably, the restrictor means also includes a conduit 54 in communication with an external air source 56. The conduit may also include annular collector 58 in fluid communication with each slot 50; conduit 54 communicating external air to annular collector 58 in which the external air is distributed and directed through slots 50 into annular chamber 15.

The restrictor means also includes valve 60 disposed to control fluid flow through conduit 54 and responsive to engine performance parameters. Such a valve, of known construction, is electrically activated by a signal from an engine operating condition sensor to open conduit 54 when the turbine is operating at certain conditions, such as start and idle, and to close conduit 54 when the turbine is operating at other conditions, such as above idle. Preferably, the operating condition is determined by sensing rotor speed, although any other parameter could be used which would indicate that the turbine is in the start or idle condition.

In one embodiment, depicted in FIG. 1, the external air source 56 is the same source as provides external air for an air blast nozzle 20, and the valve 60 selectively opens and closes the conduit from external air source 56 in response to engine operating conditions to communicate external air to airblast valve 20 and to collectors 58. Conduit 54 connects with external air flow downstream of valve 60 and upstream of air blast nozzle 20.

In another embodiment depicted in FIG. 2, separate external air source 56 is provided and separate valve 62 responsive to an engine parameter sensor is placed in the conduit 54 connecting external air source 56 to collector 58.

In both embodiments, external air is communicated to slots 50 by a conduit 54 only when engine operating parameters indicate the turbine is operating in a start or idle condition. Thus, annular vortex 52 is only generated in annular chamber 15 when reduced fuel is being injected into first combustion zone 7 due to reduced power requirements. Generation of annular vortex 52 reduces the inlet air flow to primary inlet 22 thereby ensuring that optimum fuel air mixture is maintained in first combustion zone 7 through all ranges of operation of the turbine.

It will be apparent to those skilled in the art that various modifications and variations could be made in the combustor of the invention without departing from the scope or spirit of the invention.

What is claimed is:

1. A combustor for a gas turbine comprising:
   (a) a burner having an axis and defining an axial fluid-flow path between upstream and downstream ends thereof;
   (b) a burner casing coaxially surrounding said burner and defining an annular conduit, said casing including a combustion gas inlet positioned proximate the burner downstream end, said conduit for conducting said inlet gas flow from the downstream end to the upstream end of said burner;
   (c) means for introducing fuel into said burner proximate the upstream end thereof;
   (d) first means for introducing a primary part of said inlet gas into said burner proximate the upstream end thereof to generate a combustible fuel-gas mixture; and
   (e) restrictor means for introducing gas from a source external to said inlet gas flow into said annular conduit and for generating a pneumatic restriction to inlet gas flow to said first means when said turbine is operating at predetermined operating conditions.

2. The combustor of claim 1 wherein said restrictor means comprises port means in said burner casing for introducing external gas into said annular chamber and for generating said pneumatic restriction, means for conducting external gas to said port means, and valve means responsive to turbine operating conditions for controlling external gas flow through said conducting means.

3. The combustor of claim 2 wherein said conducting means is a conduit in fluid communication with a source of external gas and wherein said valve means is a valve in said conduit, said valve being responsive to an electrical signal representing turbine operating conditions.

4. The combustor of claim 3 wherein said electrical signal represents turbine rotor speed and said valve opens said conduit when rotor speed is below a predetermined value.

5. The combustor of claim 2 wherein said port means comprises a plurality of slots annularly spaced about the burner casing, each of said slots being oriented to introduce said external gas at an angle less than 90° relative to the burner axis and in a direction opposite to the flow direction of the inlet gas flow, each slot directing said external gas into the flow path of said inlet gas for generating a pneumatic restriction in the form of an annular vortex, said vortex restricting inlet gas flow through a portion of said annular chamber.

6. The combustor of claim 5 wherein said conducting means comprises an annular collector in fluid communication with each said slot and a conduit providing fluid communication between said collector and a source of external gas.

7. The combustor of claim 5 wherein said fuel introducing means is an air blast fuel nozzle, wherein said valve means is an air blast valve controlling external air flow to said air blast fuel nozzle, and wherein said source of external gas is the external air flow to said air blast fuel nozzle downstream of said air blast valve.

8. The combustor of claim 7 wherein said conducting means comprises an annular collector in fluid communication with each said slot and a conduit providing fluid communication between said collector and the external air flow to said air blast fuel nozzle.

9. A combustor for a gas turbine comprising:
(a) a burner having an axis and an upstream end and a downstream end relative to axial fluid flow therethrough and including, in the direction of axial fluid flow therethrough, a first combustion section, a second combustion section and an exhaust section;
(b) a burner casing defining an annular chamber surrounding said burner, said burner casing including a combustion air inlet proximate said burner downstream end, said annular chamber defining a path for flow of inlet air in a direction opposite said axial fluid flow;
(c) means for introducing fuel into said first combustion section;
(d) first means for introducing a primary part of said inlet air into said first combustion section to generate a combustible fuel-air mixture therein;
(e) second means for introducing a primary part of said inlet air into said burner at the intersection between said first and second combustion sections to generate a combustible fuel-air mixture in said second combustion section;
(f) means for introducing a dilution part of said inlet air into said exhaust section to control the temperature of burner exhaust;
(g) restrictor means for introducing air from a source external to said inlet air flow into said annular chamber and for generating a pneumatic restriction to flow of said inlet air to said first means; and
(h) valve means for controlling flow of external air to said restrictor means, said valve means permitting generation of said pneumatic restriction when said turbine is operating a predetermined operating conditions.

10. The combustor of claim 9, wherein said restrictor means comprises:
(a) a plurality of annularly spaced slots in said burner casing, each of said slots having a sharp-edged exit and being oriented for directing external air into the flow path of said inlet air downstream of said second primary means, said external air entering said annular chamber in a direction opposite to the inlet air flow direction and at an angle less than 90° to the burner axis for generating an annular vortex restricting air flow through a portion of said annular chamber, and
(b) conduit means providing fluid communication between an external air source and said slots.

11. The combustor of claim 10 wherein said valve means comprises a valve controlling flow through said conduit means, said valve being responsive to an electrical signal representing turbine operating conditions.

12. The combustor of claim 10 wherein said fuel introducing means is an air blast fuel nozzle, wherein said valve means is an air blast valve controlling external air flow to said air blast nozzle, and wherein said external air source is the external air flow downstream of said air blast valve.

* * * * *